US009441665B2

(12) United States Patent
Liang et al.

(10) Patent No.: US 9,441,665 B2
(45) Date of Patent: *Sep. 13, 2016

(54) SYSTEMS AND METHODS FOR A LOCKING CARABINEER

(71) Applicant: Nite Ize, Inc., Boulder, CO (US)

(72) Inventors: Robin Liang, Yangjiang (CN); Bowden Ormsbee, Longmont, CO (US); Richard N. Case, Boulder, CO (US); Rex W. Stevens, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/149,292

(22) Filed: Jan. 7, 2014

(65) Prior Publication Data

US 2014/0115840 A1    May 1, 2014

Related U.S. Application Data

(63) Continuation-in-part of application No. 13/786,855, filed on Mar. 6, 2013.

(60) Provisional application No. 61/749,299, filed on Jan. 5, 2013.

(30) Foreign Application Priority Data

Mar. 7, 2012    (CN) ...................... 2012 2 0083757 U

(51) Int. Cl.
*F16B 45/02*    (2006.01)
*F16B 45/06*    (2006.01)

(52) U.S. Cl.
CPC ............... *F16B 45/02* (2013.01); *F16B 45/06* (2013.01); *Y10T 24/45372* (2015.01)

(58) Field of Classification Search
CPC ... F16B 45/02; B66C 1/36; Y10T 24/45361; Y10T 24/45335; Y10T 24/45288; Y10T 24/3485; Y10T 24/4545; Y10T 24/4534; Y10T 24/45414

See application file for complete search history.

(56) References Cited

U.S. PATENT DOCUMENTS

| 437,380 | A | | 9/1890 | Lundborg | |
|---|---|---|---|---|---|
| 1,025,666 | A | * | 5/1912 | Yeagle | 24/599.4 |
| 1,114,289 | A | * | 10/1914 | Rittenhouse | 59/85 |
| 1,165,606 | A | * | 12/1915 | King | 24/599.9 |
| 1,287,825 | A | * | 12/1918 | Ballou, Jr. | 24/599.4 |

(Continued)

FOREIGN PATENT DOCUMENTS

DE    202004003908 U1    5/2004

*Primary Examiner* — Robert J Sandy
*Assistant Examiner* — Matthew Sullivan
(74) *Attorney, Agent, or Firm* — Haynes and Boone, LLP

(57) ABSTRACT

An apparatus for attaching items includes a body, first hook, and second hook oriented on a first side and a second side of the body. The apparatus further includes a first gate and a second gate, the first gate attached to the body and oriented to close the first hook, and the second gate attached to the body and oriented to close the second hook. The apparatus further includes a first sliding lock and a second sliding lock, the first and second sliding locks oriented on the first and second gates, respectively; the first and second sliding locks having a first position, being a locked position, where the sliding lock is positioned in a first notch and a second notch in the body, and a second position, being an unlocked position, where the first and second sliding locks are distal from the first and second notches.

6 Claims, 4 Drawing Sheets

(56) References Cited

U.S. PATENT DOCUMENTS

| | | | |
|---|---|---|---|
| 2,064,133 A | 12/1936 | Von Schroeder | |
| 3,331,109 A * | 7/1967 | MacMillan et al. | 294/82.21 |
| 3,630,475 A | 12/1971 | Barry | |
| D244,910 S | 7/1977 | Chasen et al. | |
| D271,465 S | 11/1983 | Boissonnet | |
| D271,466 S | 11/1983 | Boissonnet | |
| D273,273 S | 4/1984 | Faidide | |
| D282,904 S | 3/1986 | Faidide | |
| D292,385 S | 10/1987 | Udelhofen | |
| D323,104 S | 1/1992 | Russell et al. | |
| D407,297 S | 3/1999 | Mihailovic | |
| D425,781 S | 5/2000 | Hopper | |
| D448,655 S | 10/2001 | Lai | |
| D466,791 S | 12/2002 | Kelleghan | |
| D468,997 S | 1/2003 | Chang | |
| D475,605 S | 6/2003 | Kelleghan | |
| D493,092 S | 7/2004 | Kalat | |
| D508,525 S | 8/2005 | Goldberg | |
| D521,362 S | 5/2006 | Kelleghan | |
| D528,238 S * | 9/2006 | Kramer | D26/38 |
| 7,214,171 B2 | 5/2007 | Thelen et al. | |
| D577,574 S * | 9/2008 | Liang | D8/367 |
| D594,738 S | 6/2009 | Kelleghan | |
| D603,293 S | 11/2009 | Merriam-Smith | |
| D607,712 S | 1/2010 | Kelleghan | |
| D612,710 S | 3/2010 | Kelleghan | |
| D626,393 S | 11/2010 | Ormsbee | |
| D631,332 S | 1/2011 | Bauer et al. | |
| D631,333 S | 1/2011 | Bauer et al. | |
| D637,473 S | 5/2011 | Mitchell | |
| D646,556 S | 10/2011 | Kelleghan | |
| 8,151,419 B2 | 4/2012 | Rolain et al. | |
| D665,655 S | 8/2012 | Ishii | |
| D669,764 S | 10/2012 | Kelleghan | |
| D670,555 S | 11/2012 | Lin | |
| D684,845 S | 6/2013 | Wood | |
| D686,058 S | 7/2013 | Paik et al. | |
| D688,118 S | 8/2013 | Hobson | |
| D698,626 S * | 2/2014 | Ormsbee et al. | D8/356 |
| 2002/0050032 A1 | 5/2002 | Carnall | |
| 2005/0087662 A1 | 4/2005 | Jacobs | |
| 2007/0119891 A1 | 5/2007 | Lawrence | |
| 2009/0000086 A1 | 1/2009 | Bing | |

\* cited by examiner

SYSTEMS AND METHODS FOR A LOCKING CARABINEER

CROSS-REFERENCE TO RELATED APPLICATIONS

This application is a continuation-in-part of U.S. patent application Ser. No. 13/786,855 filed Mar. 6, 2013, which claims the benefit of U.S. Provisional Application No. 61/749,299 filed Jan. 5, 2013, and CN Patent Application No. 201220083757.8 filed Mar. 7, 2012. These applications are hereby incorporated by reference to the same extent as though fully contained herein.

BACKGROUND

Carabineers find usage in many situations for securely hanging objects from a variety of attachment points. At times, the gate on a carabineer may be dislodged by occurrences during movement and may result in the opening of the gate and the detachment of the carabineer. This detachment is undesirable.

SUMMARY

In one embodiment, an apparatus for attaching items includes a body, a first hook, and a second hook oriented on a first side of the body and a second side of the body. The apparatus further includes a first gate and a second gate, the first gate attached to the body and oriented to close the first hook, and the second gate attached to the body and oriented to close the second hook. The apparatus further includes a first sliding lock and a second sliding lock, the first and second sliding locks oriented on the first and second gates, respectively, the first and second sliding locks having a first position, the first position being a locked position where the sliding lock is positioned in a first notch and a second notch in the body, and a second position, the second position being an unlocked position where the first and second sliding locks are distal from the first and second notches. Optionally, the first and second notches are proximate to a first pivot point and a second pivot point of the first and second gates, respectively. In one configuration, the body has an S-like shape, the first and second hooks forming the S-like shape.

In another embodiment, a double carabineer includes a carabineer body, the carabineer body having a first hook and a second hook, the first and second hooks having a first opening and a second opening, respectively. The double carabineer further includes a first gate and a second gate, the first and second gates interconnected with the carabineer body, such that the first gate closes the first opening and the second gate closes the second opening. The double carabineer further includes a first slide and a second slide, the first and second slides configured to slide up and down the first and second gates, respectively.

In another embodiment, a locking carabineer includes a carabineer body having a first hook, the first hook having a first opening. The locking carabineer further includes a first gate interconnected with the carabineer body, such that the first gate closes the first opening. The locking carabineer further includes a first slide configured to slide up and down the first gate, the first slide having a first position and a second position in relation to the carabineer body, the first position locking the first gate and the second position unlocking the first gate. Optionally, the carabineer body has a first notch, proximate to where the first gate is interconnected with the carabineer body, the first notch sized to receive the first slide when the first slide is in the first position. In one embodiment, the first slide prevents the first gate from rotating to an open position by pressing against the first notch.

In another embodiment, the carabineer body includes a second hook, the second hook having a second opening, and further includes a second gate interconnected with the carabineer body, such that the second gate closes the second opening and a second slide configured to slide up and down the second gate, the second slide having a third position and a fourth position in relation to the carabineer body, the third position locking the second gate and the fourth position unlocking the second gate. In one alternative, the carabineer body has a second notch, proximate to where the second gate is interconnected with the carabineer body, the second notch sized to receive the second slide when the second slide is in the third position, and the second slide prevents the second gate from rotating to an open position by pressing against the second notch.

In another alternative, the first and second hooks form an S-shape in the carabineer body. Optionally, the first and second gates are wireframe gates, and the wireframe gates include the first and second slides, and each slide includes a tab, the tab sized to fit inside the wireframe gates to prevent the first and second gates from sliding off an end of the wireframe gates. Alternatively, the first and second slides have an approximately oval shape around the wireframe gates. Optionally, the first and second slides each have a notch configured to allow removal of the first and second slides. In another alternative, the first and second slides each have a first opening and a second opening at each end, and the first and second slides narrow gradually from the first and second openings, such that the narrowing at the second opening prevents the first and second slides from sliding off of the first and second carabineer gates, respectively.

In one embodiment, a method of using a locking double carabineer includes providing a locking double carabineer having a slide on each of a first gate and a second gate; sliding the slide on the first gate from a first locked position to a second unlocked position; and opening the first gate. Optionally, the method further includes closing the first gate by sliding the slide on the first gate from the second unlocked position to the first locked position, wherein the first gate is locked. In another embodiment, the first locked position positions the slide of the first gate in a notch in a body of the double locking carabineer, the slide preventing the first gate from opening when the slide is in the notch. Optionally, the notch is located near an interconnection point of the first gate with the body of the double carabineer. In another alternative, the body includes a first hook and a second hook, and the first and second hooks form an S-shape in the carabineer body. Optionally, the first and second gates are wireframe gates, and the wireframe gates include the first and second slides, and each slide includes a tab, the tab sized to fit inside the wireframe to prevent the first and second gates from sliding off an end of the wireframe gates.

BRIEF DESCRIPTION OF THE DRAWINGS

FIG. 4b shows a cross-section of the lock portion of FIG. 4a;

DETAILED DESCRIPTION OF THE DRAWINGS

Figure 1:
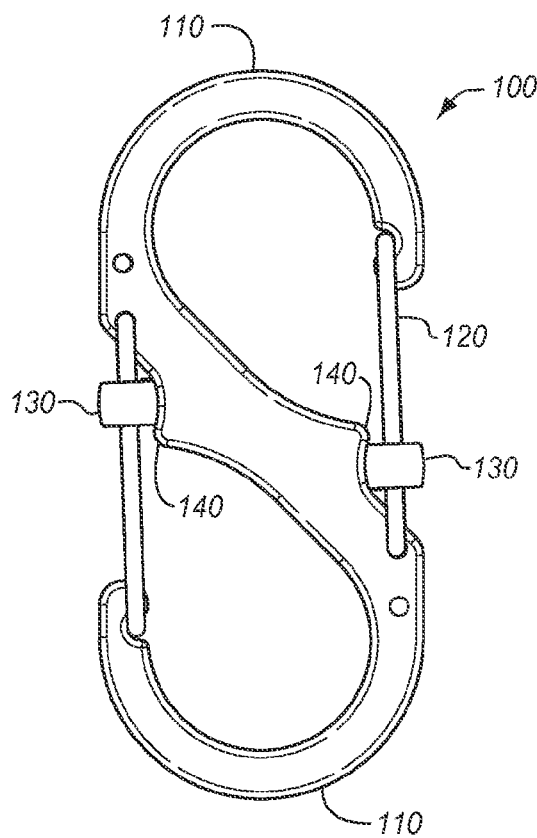
FIG. 1 shows a front view of one embodiment of a locking double carabineer.

Various systems and methods are included in a locking double carabineer. FIG. 1 shows one embodiment of a locking double carabineer (LDC) 100. LDC 100 includes a top and bottom hook 110. Gates 120 are oriented to close over each hook 110. Sliding lock 130 provides for the locking of the gates 120 of the LDC 100 by sliding to a locking position in notch 140. As is clear from the figure, sliding lock 130 braces the gates 120 of the LDC 100. Therefore, even when pressure is applied to the gates 120, they will not open. The sliding lock 130 may slide up and down the gate 120.

Figure 2:
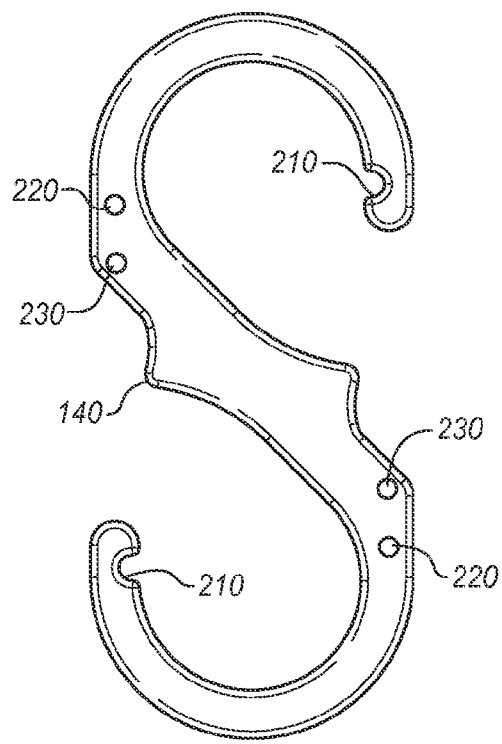
FIG. 2 shows a front view of the hook portion of the locking double carabineer of FIG. 1.

FIG. 2 shows the hook 110 portions of the LDC 100 with the additional hardware removed. The hook portion includes gate apertures 220, 230 and gate notches 210.

Figure 3:
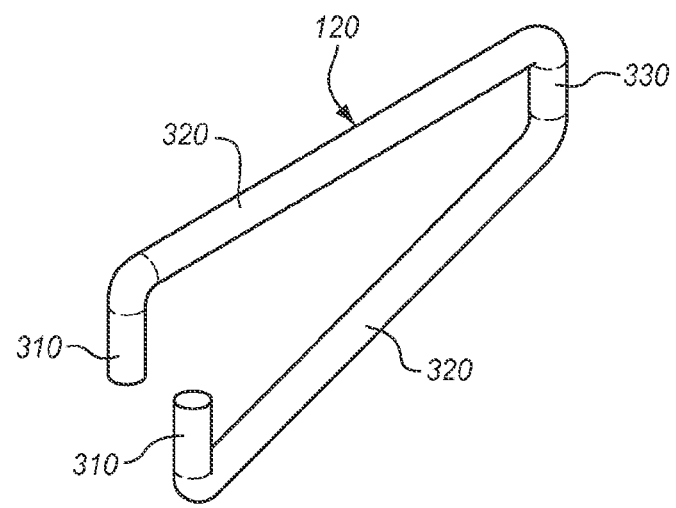
FIG. 3 shows the gate portion of the locking double carabineer of FIG. 1.

FIG. 3 shows gate 120. Gate 120 includes pegs 310, angled portion 330, and arms 320.

Figure 4A:
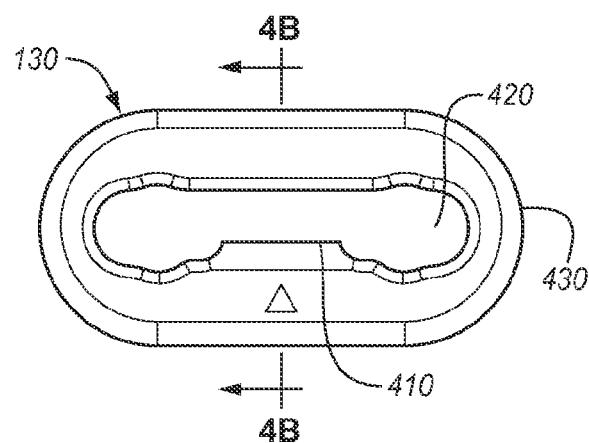
FIG. 4a shows the lock portion of the locking double carabineer of FIG. 1.
Figure 4B:
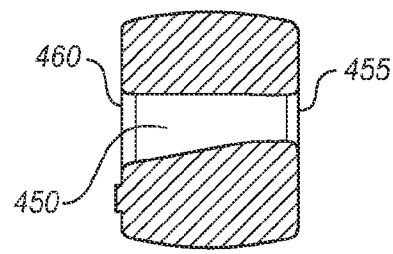

FIG. 4a shows the sliding lock 130. The sliding lock 130 includes an aperture for receiving gate 120, an outer body 430, and tab 410, which prevents the sliding lock 130 from sliding off of gate 120. This reduced area of thickness is visible in FIG. 4b at end 455. The dimensions of end 460 and space 450 are such that they may accommodate and easily slide over gate 120, while tab 410 makes end 455 too thin to pass over the end of gate 120.

Figure 5A:
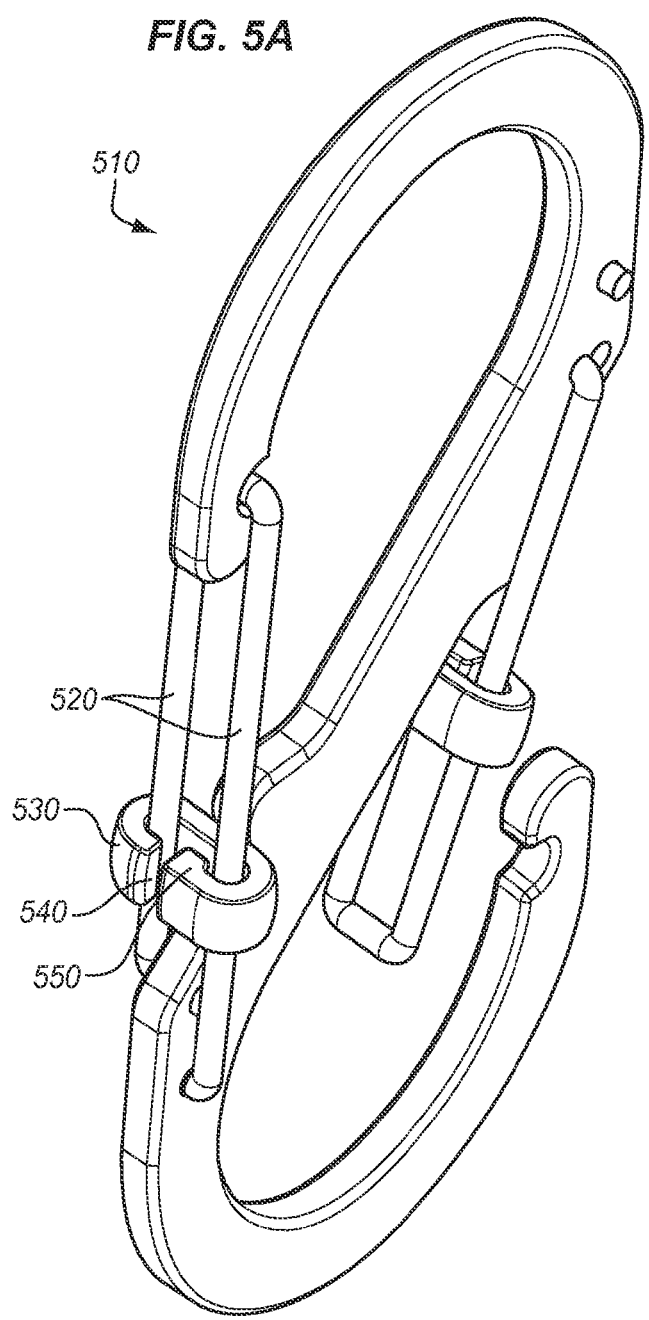
FIGS. 5a and 5b show another embodiment of a locking double carabineer.
Figure 5B:
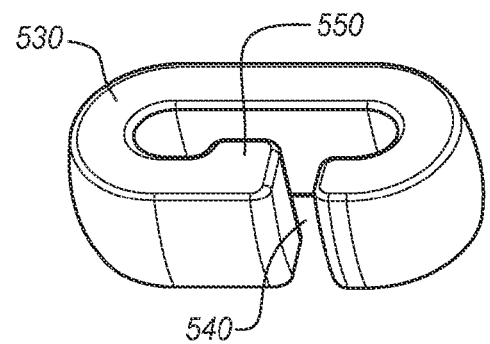

FIGS. 5a and 5b show an alternative embodiment of a locking double carabineer 510. In this embodiment, an alternative sliding lock 530 is shown. Like the previous sliding lock 130, this sliding lock 530 serves to lock gate 520 of carabineer 510. The sliding lock 530 is more easily removed from gate 520. Sliding lock 530 has an open G-like shape with opening 540 and tab 550. As stated above in reference to tab 410, tab 550 prevents the sliding lock 530 from sliding off the end of carabineer 510. The opening 540 allows for sliding lock 530 to be bent and removed and put on gate 520.

Figure 6:
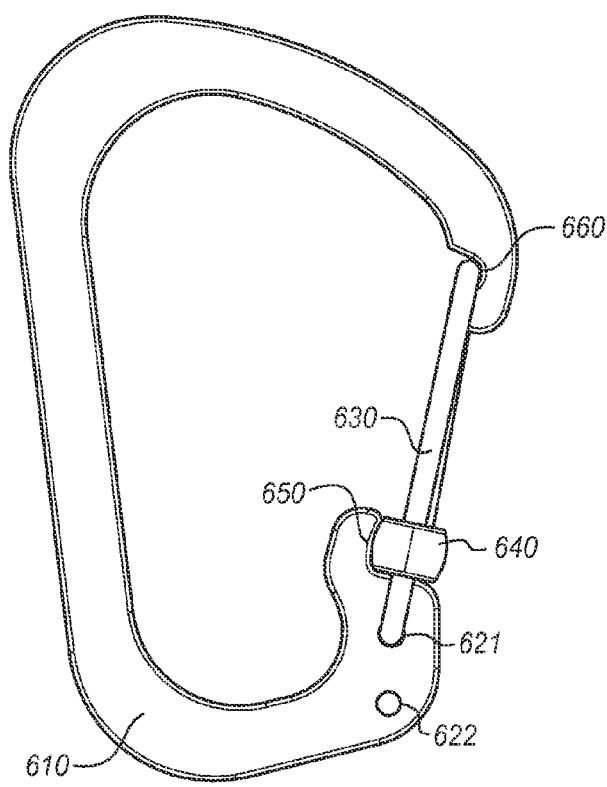
FIG. 6 shows a side view of one embodiment of a locking carabineer.
Figure 7:
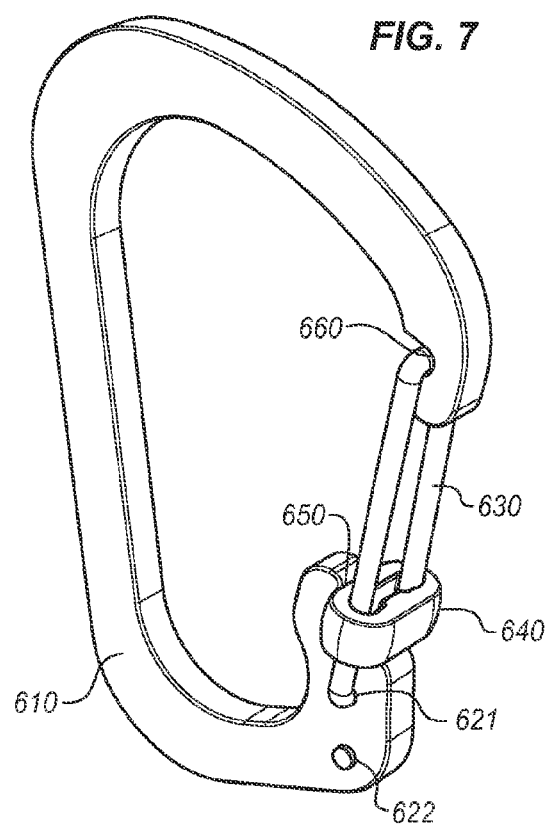
FIG. 7 shows a perspective view of the locking carabineer of FIG. 6.

FIGS. 6 and 7 show another embodiment of a locking carabineer. In this embodiment, the locking carabineer includes a body portion 610. Body portion 610 interfaces with gate 630, which includes pegs 621, 622 that provide for closure of the carabineer. Gate 630 interfaces with notch 660 in body portion 610. Additionally, sliding lock 640 is included on gate 630. Sliding lock 640 slides up and down gate 630. As shown, sliding lock 640 is in a locked position as it rests against lower notch 650. When sliding lock 640 is slid up gate 630, gate 630 may be released allowing the user to open the carabineer.

The previous detailed description is of a small number of embodiments for implementing the systems and methods for a locking carabineer and is not intended to be limiting in scope. The following claims set forth a number of the embodiments of the systems and methods of a locking carabineer disclosed with greater particularity.

What is claimed:

1. An apparatus for attaching items, the apparatus comprising:
    a body;
    a first hook oriented on the body;
    a first gate, the first gate attached to the body and oriented to close the first hook; and
    a first sliding lock, the first sliding lock oriented on the first gate, the first sliding lock having a first position, the first position being a locked position where the sliding lock is positioned in a first notch in the body, and a second position, the second position being an unlocked position where the first sliding lock is distal from the first notch, wherein the first sliding lock is oriented to surround the gate.

2. The apparatus of claim 1, wherein the first notch is proximate to a first pivot point of the first gate.

3. The apparatus of claim 1, wherein the body has an S-like shape, and includes a second hook, opposite the first hook, the second hook attached to a second gate, the second gate having a second sliding lock, the second sliding lock configured to rest against a second notch in the body and lock the second gate, the first and second hooks forming the S-like shape.

4. The apparatus of claim 1, wherein the first sliding lock is oriented on the gate such that the first sliding lock slides up and down the gate.

5. A locking carabineer comprising:
    a carabineer body having a first hook, the first hook having a first opening;
    a first gate interconnected with the carabineer body, such that the first gate closes the first opening;
    a first slide configured to slide up and down the first gate, the first slide having a first position and a second position in relation to the carabineer body, the first position locking the first gate and the second position unlocking the first gate, wherein the carabineer body has a first notch, proximate to where the first gate is interconnected with the carabineer body, the first notch sized to receive the first slide when the first slide is in the first position, the first slide prevents the first gate from rotating to an open position by pressing against the first notch; and
    the carabineer body has a first notch, proximate to where the first gate is interconnected with the carabineer body, the first notch sized to receive the first slide when the first slide is in the first position, and the first slide prevents the first gate from rotating to an open position by pressing against the first notch, and the first gate is a wireframe gate, and the wireframe gate includes a first slide, and the first slide includes a tab, the tab sized to fit inside the wireframe gate to prevent the first gate from sliding off an end of the wireframe gate.

6. A method of using a locking carabineer, the method comprising:
    providing a locking carabineer having a slide on a first gate;
    sliding the slide on the first gate from a first locked position to a second unlocked position;
    opening the first gate;
    closing the first gate; and
    sliding the slide on the first gate from the second unlocked position to the first locked position, wherein the first gate is locked, wherein the first locked position positions the slide of the first gate in a notch in a body of the locking carabineer, the slide preventing the first gate from opening when the slide is in the notch, the notch is located near an interconnection point of the first gate with the body of the locking carabineer, the body includes a first hook and the first gate is a wireframe gate, and the wireframe gate includes the first slide on the first gate, and the first slide includes a tab, the tab sized to fit inside the wireframe gate to prevent the first gate from sliding off an end of the wireframe gate.

* * * * *